Nov. 9, 1965  H. E. SCHULTZE  3,216,535
SHOCK ABSORBER OF THE ROD METERED TYPE
Filed Aug. 19, 1963
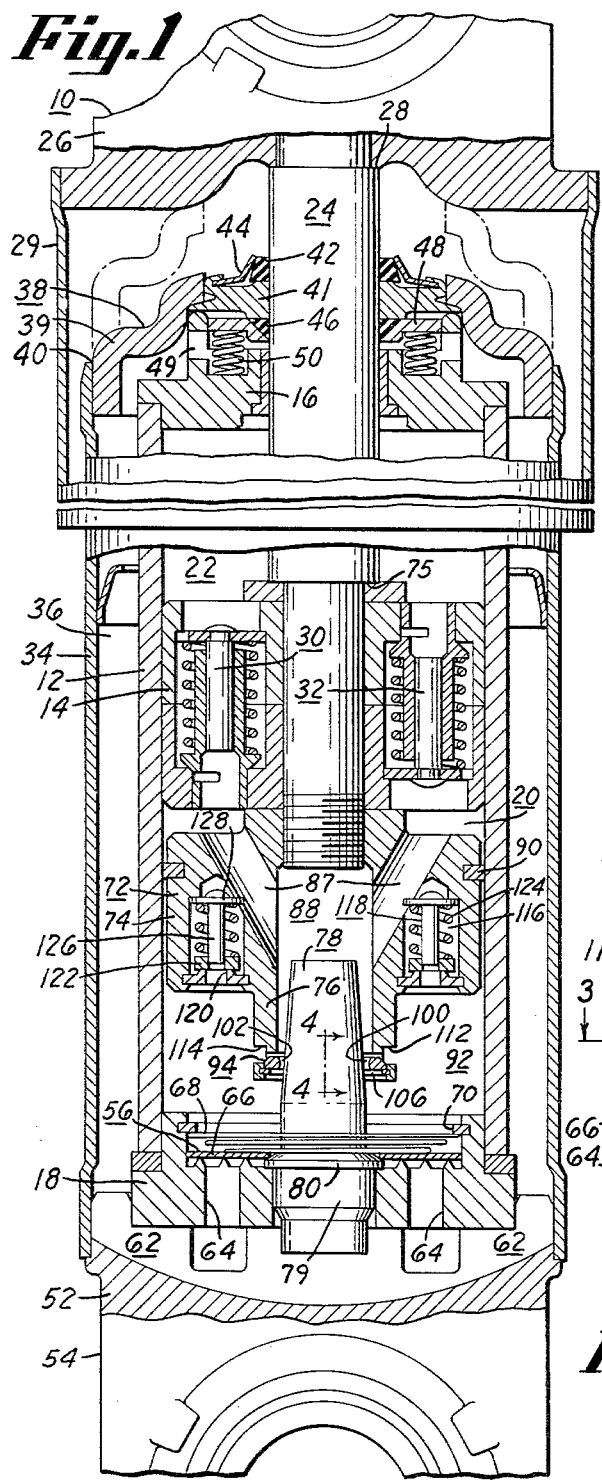
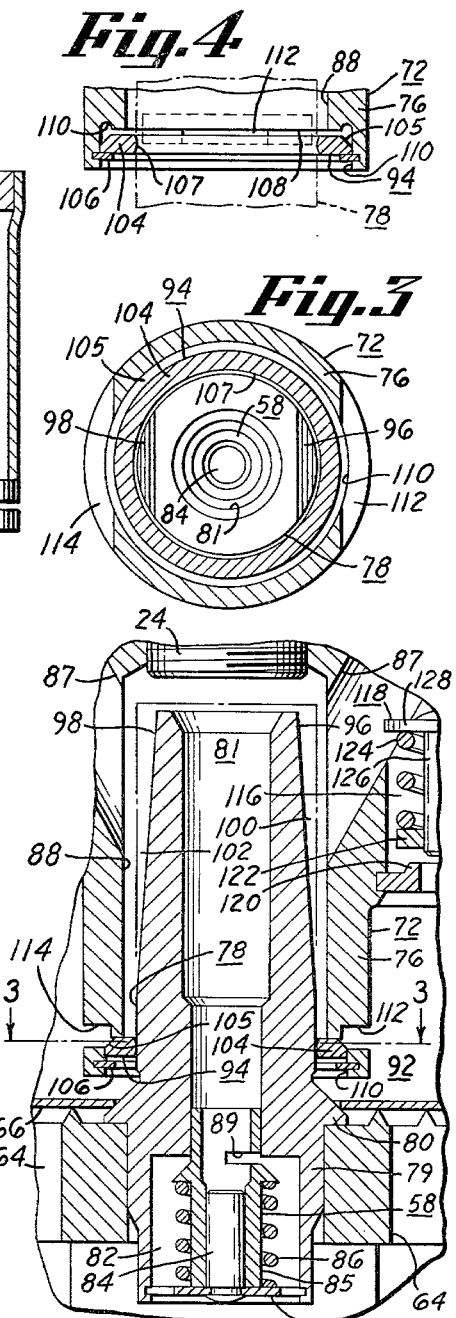
INVENTOR.
HAROLD E. SCHULTZE
BY
J. C. Evans
ATTORNEY United States Patent Office 3,216,535
Patented Nov. 9, 1965

3,216,535
SHOCK ABSORBER OF THE ROD
METERED TYPE
Harold E. Schultze, Dayton, Ohio, assignor to General
Motors Corporation, Detroit, Mich., a corporation of
Delaware
Filed Aug. 19, 1963, Ser. No. 302,798
7 Claims. (Cl. 188—88)

This invention relates to hydraulic shock absorbers and more particularly to direct-acting shock absorbers.

The U.S. Patents 2,984,321 and 3,036,669, issued May 16, 1961, and May 29, 1962, respectively, to Schultze, disclose direct-acting hydraulic shock absorbers having compression cut-off means therein for producing a hydraulic bump stop that supplements or replaces the energy absorbing action of resilient mechanical bump stop means operatively arranged between relatively movable sprung and unsprung masses. While the compression cut-off arrangements set forth in the above patents are suited for their intended purpose, it has been found that under severe shock loading conditions, as for example, those conditions that a vehicle encounters in cross-country travel, forces occur in the compression cut-off arangements capable of damaging the operative parts of the shock absorber.

Accordingly, an object of the present invention is to provide a compression cut-off arrangement in a direct-acting hydraulic shock absorber that includes means in association therewith for relieving the pressure buildup in an auxiliary compression chamber in order to avoid damaging the operative parts of the shock absorber.

A further object of the present invention is to provide an improved compression cut-off arrangement in a direct-acting hydraulic shock absorber for cushioning high velocity movements therein including the provision of means serving the dual function of restricting and opening fluid flow from an auxiliary compression chamber during the compression and rebound strokes, respectively, to maintain desired shock absorber damping actions during the compression and rebound strokes of the shock absorber.

Further objects and advantages of the present invention will be apparent from the following description, reference being had to the accompanying drawings wherein a preferred embodiment of the present invention is clearly shown.

In the drawings:

FIGURE 1 is a vertical cross-sectional view of a hydraulic shock absorber incorporating features of this invention;

FIGURE 2 is an enlarged view in vertical section of a portion of the compression cut-off assembly of the present invention;

FIGURE 3 is a view in horizontal section taken along the line 3—3 of FIGURE 2; and FIGURE 4 is an enlarged fragmentary view in vertical section taken along the line 4—4 of FIGURE 1.

Referring now to FIGURE 1, a shock absorber 10 is illustrated for damping relative movements between sprung and unsprung masses such as the chassis and axle-wheel assembly of a vehicle. The shock absorber 10 comprises a cylinder tube 12 having a reciprocable piston 14 slidably mounted therein in sealing engagement with the inner wall of the cylinder tube 12. One end of the cylinder tube 12 is closed by a rod guide element 16 and the opposite end thereof is closed by an intake valve plate 18 with the rod guide element 16 and valve plate 18 cooperating with the piston 14 to form a compression chamber 20 and a rebound chamber 22 on either side thereof. Within the rebound chamber 22 an elongated piston rod 24 is located having one end thereof directed outwardly of the cylinder tube 12 through the rod guide element 16 exteriorly of the shock absorber 10 where it is adapted to be secured to a sprung mass by means of a shock absorber fastener eye 26 connected to rod 24 at 28 by suitable means such as welding. A dust shield 29 depends from the outer edge of eye 26 along a portion of the length of the shock absorber 10 to prevent the entrance of foreign matter into the operative parts thereof.

The opposite end of the rod 24 supports the piston 14 for reciprocal movement within the cylinder tube 12 and the piston 14 includes opposed valve assemblies 30, 32 for restricting fluid flow across the piston 14 during opposite movement thereof within the tube 12 by the rod 24. The details of the valve assemblies 30, 32 are more specifically set forth in U.S. Patent 2,785,774 issued March 19, 1957, to Long et al., with it being understood that they are merely illustrative of one suitable valving arrangement for controlling fluid flow across the piston during reciprocal movement thereof to effect desired shock absorber damping characteristics during the compression and rebound strokes of the piston 14.

The shock absorber further includes a reservoir tube 34 enclosing the cylinder tube 12 in spaced relationship therewith for forming a reservoir space 36 therebetween that is closed at one end by a two-piece seal cover assembly 38 including a cap portion 39 of an easily welded material that is inserted into tube 34 and welded thereto at 40 to prevent leakage from space 36. The cap portion 39 has a central opening therein that receives a seal support plate 41 secured to cap portion 39 by being press fit therein so as to be located in surrounding relationship with rod 24. The plate 41 engages the upper surface of the rod guide element 16 and has a seal element 42 supported on the upper surface thereof held in sealing engagement with the outer periphery of the rod 24 by means of a spring biased retainer element 44. The plate 41 which preferably is an easily machined material has a machined underside that cooperates with a wedge-shaped seal element 46 supported by a retainer element 48 located in a recess between the cap portion 39 and the rod guide element 16. A spring 50 biases the retainer element 48 and the wedge-shaped seal 46 toward plate 41 where the seal element 46 is held in sealing engagement with the outer periphery of the rod 24 and the machined underside of plate 41. The seal elements 42, 46 thereby prevent fluid leakage along the outer periphery of rod 24 and fluid from the rebound chamber 22 that enters the seal assembly 38 is returned to reservoir 36 through openings 49 in rod guide element 16.

The opposite end of the reservoir space 36 is closed by a cap portion 52 of a lower attachment bearing or fastener eye 54 that is adapted to be connected to an unsprung mass. The cap 52 includes means for supporting the intake valve plate 18 in its assembled position so as to locate a rebound intake valve assembly 56 and a base valve assembly 58 in communication with the compression chamber 20 and the reservoir space 36 for controlling fluid flow therebetween.

The shock absorber thus far described will function in a normal manner wherein movement of the piston 14 toward the base valve assembly 58 will compress fluid in the chamber 20 with excessive fluid that is not displaced into the rebound chamber 22 through the valve assembly 30 being discharged under pressure through the base valve assembly 58 into reservoir space 36, the volume of fluid flow through the base valve assembly 58 being equivalent to the displacement caused by the rod 24 entering the rebound chamber 22. The action of base valve assembly 58 will produce a damping effect for snubbing normal movements between a sprung and an unsprung mass.

On the return stroke or rebound stroke, fluid will flow from the rebound chamber 22 into the compression chamber 20 under control of the valve assembly 32 which acts to produce a desired shock absorber damping effect during rebound. Makeup fluid to fill the chamber 20 on movement of the piston 14 away from the base valve assembly 58 will be received from the reservoir space 36 through passageways 62 formed between the intake valve plate 18 and the cap 52 and thence through openings 64 through the plate 18 across a valve plate 66 that opens against the light spring force of a tapered coil spring 68 retained within the plate 18 by means of a retainer ring 70 secured therein.

In accordance wth certain of the concepts of the present invention, the shock absorber further includes an improved compression cut-off assembly 72 for producing a hydraulic cushion capable of damping high velocity movement of the piston 14 into the compression chamber 20 so as to prevent a sprung mass from impacting against an unsprung mass connected to the lower attachment bearing 54. More particularly, the compression cut-off assembly 72 comprises a cut-off piston 74 threadably secured to the end of the piston rod 24 in axial abutment with the compression chamber side of the shock absorber piston 14 to thereby hold the piston 14 against a shoulder 75 on rod 24. The cut-off piston has a tubular extension 76 thereon surrounding an elongated tubular element or compression cut-off stud 78 in telescoping relationship therewith. The stud 78 has an enlarged base portion 79 inserted through plate 18 with a radially outwardly directed flange 80 thereon seated on the upper face of plate 18 for aligning the stud 78 in operative relationship with extension 76.

The stud 78 also has an axial opening 81 directed therethrough that communicates with a chamber 82 formed by the base portion 79 in which the base valve assembly 58 is located. The base valve assembly 58, as shown in FIGURE 2, more particularly includes a retainer element 83 secured within the base portion 79 supporting a guide pin 84 having a valving element 85 slidably mounted thereon that is biased by means of a spring 86 against the upper inner surface of the base portion 79 to control communication between the passageway 81 and the chamber 82. During normal shock absorber operation, fluid will pass from the compression chamber 20 through a plurality of passageways 87 directed through the upper portion of the cut-off piston 74 from the outer periphery thereof toward the central axis thereof into communication with an opening 88 located centrally of the piston 74 that communicates with the axial passageway 81. Because of the increased pressure within the compression chamber 20 during the compression stroke, the fluid passing into the opening 88 will flow through the axial passage 81 and act on the face of the valving element 85 so as to cause a pressure differential thereacross that compresses the spring 86 to shift the element 85 into the position shown in FIGURE 2 where an opening 89 in the element 85 will communicate the passageway 81 with the chamber 82 to allow fluid flow to pass through the passageways 62 into the reservoir 36. The fluid control characteristics of the base valve assembly 58 during this period will produce damping characteristics in the shock absorber for snubbing low velocity movements between the sprung and unsprung masses associated with the shock absorber.

In order to compensate for high velocity movement between the sprung and unsprung masses the cut-off piston 74 has an annular seal element 90 supported on the outer periphery thereof that sealingly engages the inner surface of the lower end of the cylinder tube 12 so as to form an auxiliary compression chamber 92 in cooperation with the cylinder tube 12, the cut-off stud 78 and the valve plate 18.

In accordance with certain of the principles of the present invention fluid flow between the compression chamber 20 and the auxiliary compression chamber 92 is controlled by means of a cut-off valve assembly 94 supported on the end of the tubular extension 76. The cut-off valve assembly 94, as best illustrated in FIGURE 2, cooperates with flat faces 96, 98 on opposite sides of the stud 78 that are inclined toward the upper end of the stud 78 so as to form tapered openings 100, 102 between the inside surface of the tubular extension and the stud 78. Because of the tapered configuration of the openings 100, 102, the cut-off valve assembly 94 acts to progressively restrict fluid communication between the compression chamber 20 and the auxiliary compression chamber 92 as the extension 76 moves toward the stud 78. More particularly, the cut-off valve assembly 94 includes an annular valve element 104 having a chamfered surface 105 on the outer surface thereof and a surface 107 formed convexly toward the stud 78 on the inner periphery thereof. The valve element is loosely held within the end of the tubular extension 76 by means of a retainer ring 106 secured thereto and an upper shoulder 108 formed therein to control fluid flow through the passageways 100, 102, a circular opening 110 formed within the end of tubular extension 76 as best illustrated in FIGURE 4, and recesses 112, 114 formed in the outer periphery of the tubular extension 76 on either side thereof in communication with auxiliary compression chamber 92 as best illustrated in FIGURES 2 and 3.

By virtue of the above-described cut-off valve assembly 94, when the sprung and the unsprung masses associated with the shock absorber are subjected to a severe bump or impact that produces a high velocity relative movement therebetween the piston 14 will move rapidly into the compression chamber 20 and the extension 76 on the cut-off piston 74 will progressively telescope over the cut-off stud 78 during which time the valve element 104 is forced against the shoulder 108 into the position illustrated in FIGURE 2 so that the chamfered surface 105 thereon will block fluid flow across the circular opening 110 and the recesses 112, 114 so that fluid flow from chamber 92 will be restricted to a path to the compression chamber 20 defined by the passageways 87, the opening 88, and tapered openings 100, 102 and thence between the valve face 107 and the outer periphery of the stem 78 into the compression chamber 20. A pressure buildup will occur in the auxiliary compression chamber 92 which will vary in accordance with the velocity of the piston 14 and the degree of fluid restriction across face 107 of valve plate 104. The pressure thus produced will effect a shock absorber damping action best suited to prevent impact between the sprung and the unsprung masses for a particular high velocity movement therebetween.

In accordance with other of the principles of the present invention, means are provided in association with the improved compression cut-off 72 to prevent an excessive pressure buildup in the auxiliary compression chamber 92 that might damage the operative parts of the shock absorber. More particularly, the cut-off piston 74 includes a plurality of axial passageways 116 directed therethrough to communicate the auxiliary compression chamber 92 with the inclined passageways 87 under the control of a relief valve assembly 118 located in each of the axial passageways 116. Each of the relief valve assemblies 118 includes a valve seat element 120 supported within one end of passageway 116 having a valve seal element 122 held in sealing engagement therewith by means of a spring element 124 surrounding a guide pin 126 secured to the piston 74 in the opposite end of the opening 116 by means of a retainer element 128. Thus, when pressure increases in the auxiliary compression chamber 92 reach a predetermined maximum level, the valve seal element 122 will move away from the seat element 120 to allow for pressure relief from the auxiliary compression chamber 92 to the compression chamber 20. This relieving action, however, only occurs following a substantial dissipation of the shock loading on the shock absorber produced by the high velocity movements between sprung and unsprung masses associated therewith.

On the rebound stroke, the piston 14 will displace fluid from the rebound chamber 22 through the valve assembly 32 into the compression chamber 20 and fluid required to make up the space left in the compression chamber 20 by the withdrawal of the piston rod 24 therefrom will flow from the reservoir space 36 across the intake valve assembly 56 in a conventional manner. Because of the fact that the intake valve assembly 56 has a very low spring force so as to allow substantially free fluid flow from the reservoir space 36 into the auxiliary compression chamber 92, the damping characteristics of the shock absorber on rebound are generally determined by the piston assembly 32.

By virtue of the improved cut-off valve assembly of the present invention, the rebound damping characteristics are relatively free as determined by the piston valve assembly 32 since on the rebound stroke the valve plate 104 is moved against the ring 106, as best illustrated in FIGURE 1, so that circular opening 110 and openings 112, 114 will freely communicate compression chambers 92, 20 whereby make-up fluid from the reservoir 36 is free to pass therebetween.

Thus, the shock absorber of the present invention has multi-damping characteristics including a first predetermined damping action upon normal compression strokes in the shock absorber, a second predetermined damping action on the rebound stroke of the shock absorber and a third variable damping characteristic during relatively increased velocities between the sprung and the unsprung masses associated with the shock absorber that are terminated upon the occurrence of predetermined forces within the shock absorber that might damage the operative parts thereof.

While the embodiment of the present invention as herein disclosed constitutes a preferred form, it is to be understood that other forms might be adopted.

What is claimed is as follows:

1. In a direct-acting hydraulic shock absorber, the combination of, cylinder means and piston means forming a compression chamber, an elongated tubular element, a piston element having a cylindrical extension aligned in telescoping arrangement with said elongated tubular element and an outer peripheral surface slidably supported in sealing engagement with the cylinder means of the shock absorber for forming an auxiliary compression chamber, and coacting means supported by said cylindrical extension and said tubular element for progressively restricting fluid flow to the compression chamber of the shock absorber from said auxiliary compression chamber during the compression stroke including means operative during the rebound stroke to allow substantially unrestricted fluid flow between the compression chamber and said auxiliary compression chamber.

2. In a direct-acting hydraulic shock absorber, the combination of, cylinder means and a first piston element forming a compression chamber, an elongated tubular element having the outer periphery thereof tapered inwardly toward one end thereof, a second piston element having a cylindrical extension aligned in telescoping arrangement with said elongated tubular element and an outer peripheral surface slidably supported in sealing engagement with the cylinder means of the shock absorber for forming an auxiliary compression chamber, and cut-off valve means supported by said cylindrical extension cooperating with the tapered outer surface of said tubular element for progressively restricting fluid flow to the compression chamber of the shock absorber from said auxiliary compression chamber during the compression stroke, said cut-off valve means including means operative during the rebound stroke to allow substantially unrestricted fluid flow to the compression chamber from said auxiliary compression chamber.

3. In a direct-acting shock absorber the combination of, a cylinder tube, piston means slidably mounted therein for reciprocal movement relative thereto, said cylinder tube and piston means forming a compression chamber, a tubular stud element, an auxiliary piston means having a cylindrical extension thereon arranged in telescoping relationship with said stud element and having an outer peripheral surface slidably supported within said cylinder tube for forming an auxiliary compression chamber in cooperation therewith, coacting means on said cylindrical extension and said tubular stud cooperating to progressively restrict fluid flow between said compression chamber and said auxiliary compression chamber during the compression stroke of the shock absorber, relief valve means for releasing the pressure within said auxiliary compression chamber when it reaches a predetermined maximum value, and said coacting means including means operative during the rebound stroke to allow substantially unrestricted fluid flow between the compression chamber and said auxiliary compression chamber.

4. In a direct-acting hydraulic shock absorber the combination of a cylinder tube, piston means supported within said cylinder tube for reciprocal movement relative thereto, said cylinder tube and piston means cooperating to form a rebound chamber and a compression chamber, valve means supported within said piston means for controlling fluid flow between said rebound chamber and said compression chamber upon opposite reciprocal movement of said piston means therein, reservoir means, means including base valve means for communicating said compression chamber with said reservoir means, said piston valve means and said base valve means operable to produce a first predetermined damping action on the compression and rebound strokes of the shock absorber, an elongated tubular element having the outer surface thereof tapered inwardly toward one end thereof, auxiliary piston means operatively associated with said piston means for movement therewith including a cylindrical extension on one end thereof aligned in telescoping arrangement with said tubular element, said auxiliary piston means and said tubular element cooperating with said cylinder tube to form an auxiliary compression chamber, said cylindrical extension and said tubular element cooperating to progressively restrict fluid flow between said compression chamber and said auxiliary compression chamber during the compression stroke of the shock absorber to progressively increase the pressure within said auxiliary compression chamber for producing a second predetermined damping action during the compression stroke, and means operable during the compression stroke for relieving the pressure in said auxiliary compression chamber following a predetermined pressure buildup therein.

5. In a direct-acting hydraulic shock absorber the combination of a cylinder tube, piston means supported within said cylinder tube for reciprocal movement relative thereto, said cylinder tube and piston means cooperating to form a rebound chamber and a compression chamber, valve means supported within said piston means for controlling fluid flow between said rebound chamber and said compression chamber upon opposite reciprocal movement of said piston means therein, reservoir means, means including base valve means for communicating said compression chamber with said reservoir means operable to produce a first predetermined damping action on the compression stroke of the shock absorber, an elongated tubular element having the outer surface thereof tapered inwardly toward one end thereof, auxiliary piston means operatively associated with said piston means for movement therewith including a cylindrical extension on one end thereof aligned in telescoping arrangement with said tubular element, said auxiliary piston means and said tubular element cooperating with said cylinder tube to form an auxiliary compression chamber, and seal means supported by said cylindrical extension cooperating with said tubular element during the compression stroke of the shock absorber to progressively increase the pressure within said auxiliary compression chamber for producing a second predetermined damping action during the compression stroke, said seal means being operable to produce substantially unrestricted fluid flow from said compression chamber into said auxiliary compression chamber upon the rebound stroke whereby the shock absorber damping action during the rebound stroke is determined primarily by said valve means in said piston means.

6. In a direct-acting shock absorber, the combination of, a cylinder tube, piston means slidably mounted therein for reciprocal movement relative thereto, a tubular stud element, means in said cylinder tube for supporting said tubular stud element, an auxiliary piston means having a cylindrical extension thereon arranged in telescoping relationship with said stud element, said cylinder tube and piston means and said auxiliary piston forming a compression chamber, said auxiliary piston having an outer peripheral surface engageably and slidably supported within said cylinder tube, said auxiliary piston and said cylinder tube and said stud element supporting means forming an auxiliary compression chamber, coacting means on said cylindrical extension and said tubular stud element cooperating to progressively restrict fluid flow from said auxiliary compression chamber to said compression chamber during the compression stroke of the shock absorber, and relief valve means in said auxiliary piston for relieving pressure within said auxiliary compression chamber into said compression chamber following a predetermined movement of said piston means into said cylinder tube during the compression stroke.

7. In a direct-acting shock absorber, the combination of, a cylinder tube, piston means slidably mounted therein for reciprocal movement relative thereto, a tubular stud element, means in said cylinder tube supporting said tubular stud element, an auxiliary piston means having a cylindrical extension thereon arranged in telescoping relationship with said stud element, said cylinder tube and piston means and said auxiliary piston means forming a compression chamber, said auxiliary piston having an outer peripheral surface engageably and slidably supported within said cylinder tube, said auxiliary piston and said cylinder tube and said stud element supporting means forming an auxiliary compression chamber, coacting means on said cylindrical extension and said tubular stud cooperating to progressively restrict fluid flow from said auxiliary compression chamber into said compression chamber during the compression stroke of the shock absorber, and said coacting means including means operative during the rebound stroke of the shock absorber to allow substantially unrestricted fluid flow from the compression chamber into said auxiliary compression chamber.

References Cited by the Examiner

UNITED STATES PATENTS

| | | | |
|---|---|---|---|
| 1,576,286 | 3/26 | Lang | 188—96 |
| 2,907,414 | 10/59 | Patriquin | 188—88 |
| 2,924,304 | 2/60 | Patriquin | 188—88 |
| 2,984,321 | 5/61 | Schultze | 188—88 |
| 2,994,442 | 8/61 | Frederick | 267—64 X |
| 3,052,328 | 9/62 | Brueckner | 188—96 |
| 3,150,747 | 9/64 | Bliven et al. | 188—88 |

ARTHUR L. LA POINT, *Primary Examiner.*

EUGENE G. BOTZ, *Examiner.*